US 12,227,053 B2

United States Patent
Gartner et al.

(10) Patent No.: US 12,227,053 B2
(45) Date of Patent: Feb. 18, 2025

(54) DRIVERLESS TRANSPORT SYSTEM

(71) Applicants: FB Industry Automation GmbH, Albersdorf-Prebuch (AT); Frissenbichler GesmbH, Sankt Kathrein am Offenegg (AT)

(72) Inventors: Markus Gartner, Kirchbach (AT); Franz Holler, St. Lorenzen (AT); Gottfried Krainer, St. Martin i.S. (AT); Christian Wieland, Feldkirchen bei Graz (AT); Valentin Wiener, Sankt Kathrein am Offenegg (AT); Werner J. Frissenbichler, St. Kathrein am Offenegg (AT)

(73) Assignees: FB Industry Automation GmbH, Albersdorf-Prebuch (AT); Frissenbichler GesmbH, Sankt Kathrein am Offenegg (AT)

( * ) Notice: Subject to any disclaimer, the term of this patent is extended or adjusted under 35 U.S.C. 154(b) by 0 days.

(21) Appl. No.: 18/591,385

(22) Filed: Feb. 29, 2024

(65) Prior Publication Data

US 2024/0424847 A1 Dec. 26, 2024

Related U.S. Application Data

(63) Continuation of application No. 17/629,182, filed as application No. PCT/EP2020/070885 on Jul. 23, 2020, now abandoned.

(30) Foreign Application Priority Data

Jul. 23, 2019 (EP) .................................... 19187837

(51) Int. Cl.
*B60G 3/06* (2006.01)
*B60G 3/14* (2006.01)
(Continued)

(52) U.S. Cl.
CPC ................. *B60G 3/06* (2013.01); *B60G 3/14* (2013.01); *B62D 61/10* (2013.01);
(Continued)

(58) Field of Classification Search
CPC ........ B60G 3/06; B60G 3/14; B60G 2200/13; B60G 2200/14; B62D 61/10; B62D 63/02
(Continued)

(56) References Cited

U.S. PATENT DOCUMENTS 6,196,343 B1 3/2001 Strautnieks
2007/0051540 A1 3/2007 Lawson
(Continued)

FOREIGN PATENT DOCUMENTS

CN 203332260 U 12/2013
CN 103332236 B 4/2016
(Continued)

OTHER PUBLICATIONS

International Search Report and Written Opinion for International Application No. PCT/EP2020/070885, mailed Oct. 6, 2020.
(Continued)

*Primary Examiner* — Paul N Dickson
*Assistant Examiner* — Caitlin Anne Miller
(74) *Attorney, Agent, or Firm* — Wolf, Greenfield & Sacks, P.C.

(57) ABSTRACT

A driverless transport system comprising a chassis (1), drive wheels (2) and jockey wheels (3), wherein, on each of a first side of the chassis (1) and a second side of the chassis (1) opposite the first side, a floating axle (4) arranged in the longitudinal direction is pivotably connected to the chassis (1) at a connection point (5) assigned in each case, a drive wheel (2) being arranged at one end of each of the floating axles (4) and a jockey wheel (3) being arranged at the opposite end of each of the floating axles (4), the driverless
(Continued)

transport system additionally having a floating axle (6) arranged in the transverse direction which is aligned transversely to the two floating axles (4) arranged in the longitudinal direction and is pivotably or fixedly connected to the chassis (1) at an assigned connection point (5), a jockey wheel (3) being arranged at each end of the floating axle (6) arranged in the transverse direction.

10 Claims, 3 Drawing Sheets

(51) Int. Cl.
*B62D 61/10* (2006.01)
*B62D 63/02* (2006.01)
(52) U.S. Cl.
CPC ...... *B60G 2200/13* (2013.01); *B60G 2200/14* (2013.01); *B62D 63/02* (2013.01)
(58) Field of Classification Search
USPC .................................................. 180/24.02
See application file for complete search history.

(56) References Cited

U.S. PATENT DOCUMENTS

| | | |
|---|---|---|
| 2017/0080846 A1 | 7/2017 | Lord et al. |
| 2020/0079171 A1 | 3/2020 | Liu |
| 2022/0250429 A1 | 8/2022 | Gartner et al. |

FOREIGN PATENT DOCUMENTS

| | | |
|---|---|---|
| CN | 106741295 A | 5/2017 |
| CN | 107235092 A | 10/2017 |
| CN | 206437093 U | 8/2018 |
| CN | 109050712 A | 12/2018 |
| CN | 208323359 U | 1/2019 |
| CN | 110001816 A | 7/2019 |
| CN | 209112323 U | 7/2019 |
| DE | 10 2017 201 108 A1 | 7/2018 |
| EP | 3 556 581 A1 | 10/2019 |
| JP | S62-181415 U | 11/1987 |
| JP | H03-186468 A | 8/1991 |
| JP | 2021-126913 A | 9/2021 |
| WO | 2018/107674 A1 | 6/2018 |

OTHER PUBLICATIONS

International Preliminary Report on Patentability for International Application No. PCT/EP2020/070885, mailed Feb. 3, 2022.

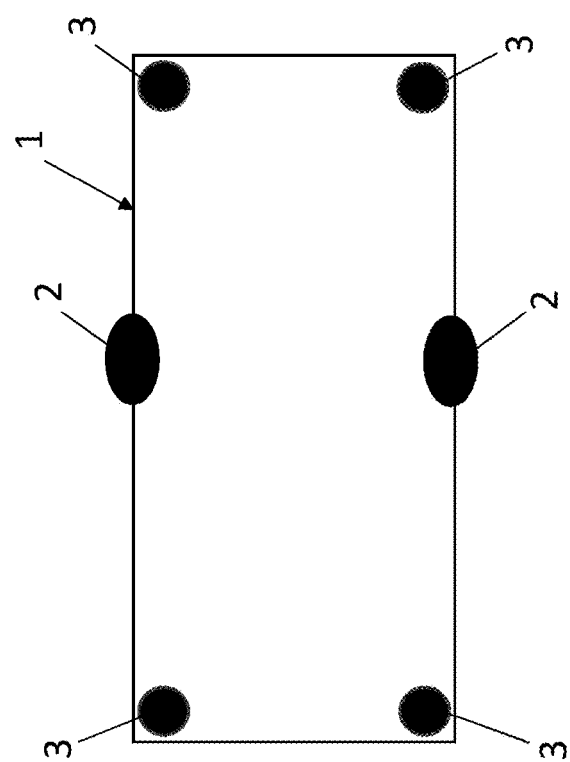

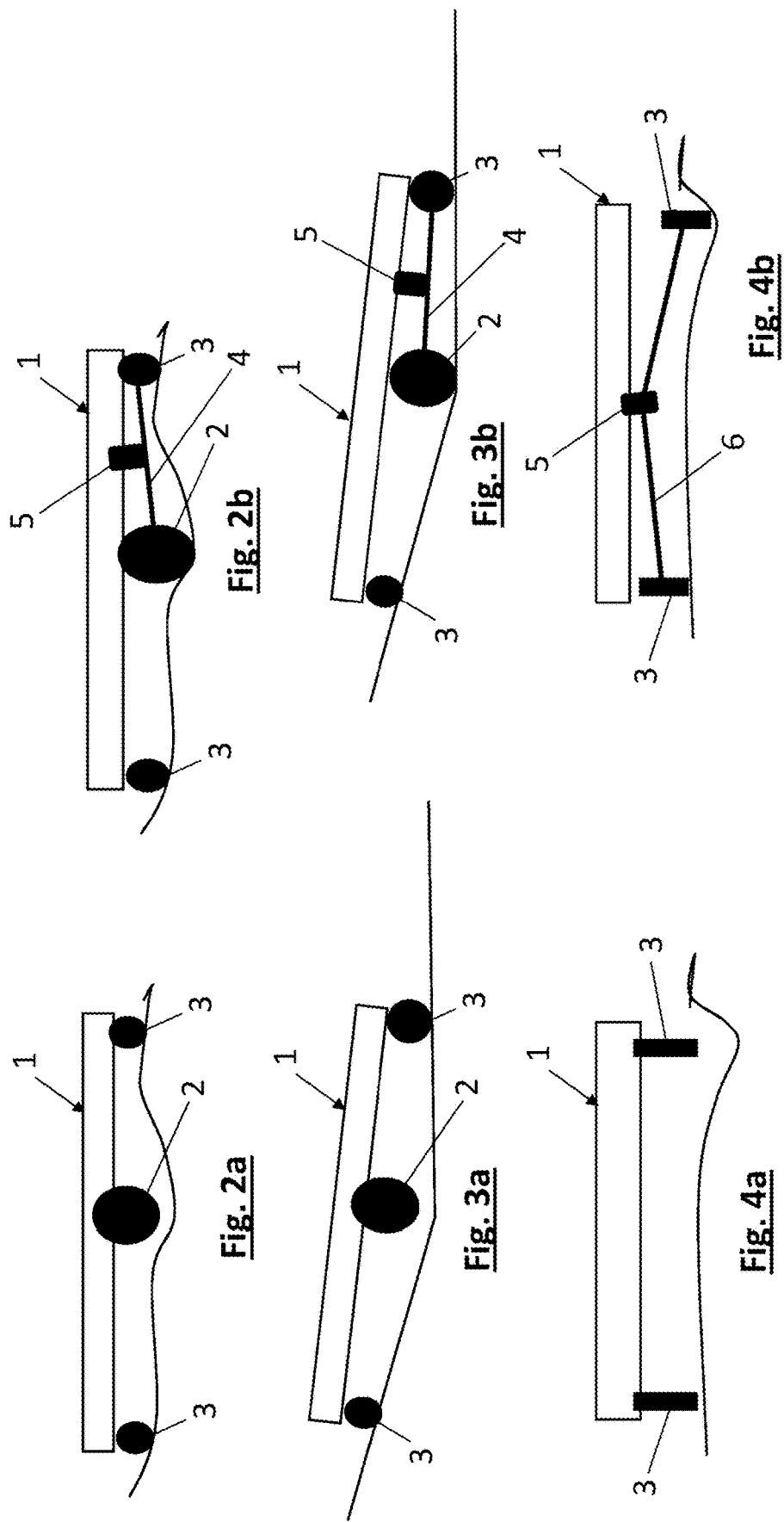

DRIVERLESS TRANSPORT SYSTEM

CROSS-REFERENCE TO RELATED APPLICATIONS

This application is continuation of U.S. application Ser. No. 17/629,182, filed Mar. 8, 2022, which is a national stage filing under 35 U.S.C. § 371 of International Application Serial No. PCT/EP2020/070885, filed Jul. 23, 2020, which claims priority to European Patent Application 19187837.0, filed Jul. 23, 2019, each of which is incorporated herein by reference in its entirety.

FIELD OF THE INVENTION

The present invention relates to a driverless transport system.

PRIOR ART

Driverless transport systems are known per se and serve for example in manufacturing companies for transporting components, containers or other transport goods, for example from one workstation to the next workstation, or from a store to a workstation, for example in automotive manufacturing.

Driverless transport systems typically comprise a bearing chassis and a structure connected to the chassis which allows for transport of the transport goods, for example deposition surfaces or work surfaces. For the purpose of driving, the transport systems typically comprise wheels that are driven by a motor, for example an electric motor, and often also additional non-driven jockey wheels.

For example, a transport system of this kind may comprise centrally located drive wheels, and be supported by four rollers attached in the corners. The four support rollers are then typically rotatably mounted on a component that is fixed to the chassis.

In the case of vehicles of this kind, the conditions of the substrate (holes, furrows, unevenness) may result in the drive wheels losing ground contact since the vehicle is supported on the fixedly mounted wheels.

Similar behavior can occur in the case of inclines. The greater the gradient angle and the distance between the front and rear jockey wheels, the greater the likelihood of the drive wheels losing ground contact.

Since all the wheels are fixedly connected to the chassis, in the case of a smooth roadway the overall weight is divided across all, for example six, wheels. As soon as the substrate is uneven, this equilibrium can be disrupted and lead to a reduction in the static friction at the drive wheels. This can cause the wheels to spin.

The conventional undercarriage geometries furthermore do not allow for compensation of shocks which are absorbed via the substrate. The rigidly mounted jockey wheels absorb the impacts undamped, and transfer these to the chassis of the vehicle. As a result, damage can occur both to the hardware of the vehicle and to the transport goods.

SUMMARY OF THE INVENTION

An object of the invention is that of improving a driverless transport system in this respect, and in particular of specifying a driverless transport system, in which the drive wheels have permanent ground contact even in the case of ground unevenness and inclines, and which can better compensate or damp impacts.

The object is solved by a driverless transport system comprising a chassis, drive wheels and jockey wheels, wherein, on each of a first side of the chassis and a second side of the chassis opposite the first side, a floating axle arranged in the longitudinal direction is pivotably connected to the chassis at a connection point assigned in each case, a drive wheel being arranged at one end of each of the floating axles and a jockey wheel being arranged at the opposite end of each of the floating axles, the driverless transport system additionally having a floating axle arranged in the transverse direction which is aligned transversely to the two floating axles arranged in the longitudinal direction and is pivotably or fixedly connected to the chassis at an assigned connection point, a jockey wheel being arranged at each end of the floating axle arranged in the transverse direction.

According to the invention, two floating axles are used for bearing a drive wheel and a jockey wheel in each case. The orientation of said floating axles, and thus of the drive and jockey wheels arranged one behind the other, to a certain extent defines the longitudinal axis of the transport system. A conventional forwards movement of the transport vehicle takes place in the direction of said floating axles "arranged in the longitudinal direction".

Connecting one drive wheel in each case to a jockey wheel, by means of an individual assigned floating axle, makes it possible for each drive wheel to have ground contact, even in the case of uneven and steep ground surfaces.

A further individual floating axle is provided for two additional jockey wheels and extends transversely to the two other floating axles, i.e. substantially as a connection between the two floating axles arranged in the longitudinal direction, and preferably normal thereto. As a result, these two jockey wheels also have ground contact, even in the case of ground unevenness. According to an embodiment, said floating axle arranged in the transverse direction can also be fixedly connected to the chassis.

The use of two drive wheels is sufficient for driving the transport system. However, in further embodiments of the invention it is also possible that some or all of the wheels referred to as "jockey wheels" may be driven. Therefore, it is also possible for each individual or all the "jockey wheels" to also constitute a "drive wheel", in addition to the minimum required drive wheels.

The geometric arrangement of the three floating axles—one in the transverse axis and two in the longitudinal direction—makes it possible to ensure that the drive wheels and also the jockey wheels have permanent ground contact in the case of typical ground conditions. This arrangement also makes it possible to compensate impacts, which has a positive effect on the service life of the hardware. In addition, on account of the damping achieved, the transport goods are protected against damage or undesired slipping due to vibrations.

Arranging the three floating axles, one in the transverse direction, preferably at the front of the vehicle, and two in the longitudinal direction, makes it possible for the transport vehicle to handle unevenness and inclines of up to 7%, depending on the design, without the drive wheels losing ground contact.

Further developments of the invention are specified in the dependent claims, the description, and the accompanying drawings.

Preferably, at least in normal operation upon movement of the transport system in a forwards direction, the two floating axles arranged in the longitudinal direction are oriented so as to be in parallel with one another.

The floating axle arranged in the transverse direction is preferably oriented so as to be normal to the two floating axles arranged in the longitudinal direction.

The floating axle arranged in the transverse direction is preferably located in the front of the transport system and thus forms a front axle of the transport system.

The drive wheels of the floating axles arranged in the longitudinal direction are preferably each arranged at the end of the floating axles which is closer to the floating axle arranged in the transverse direction. The drive wheels are preferably located close to the center of the transport vehicle in the longitudinal direction.

The four jockey wheels of the three floating axles preferably form a rectangle.

The chassis is preferably rectangular in shape. In this case, the special case of square is covered by the specification "rectangular in shape".

The four jockey wheels are preferably located in the corners of the chassis or of the transport vehicle.

The respective connection points at which the floating axles arranged in the longitudinal direction are pivotably connected to the chassis are preferably located closer to the respective drive wheel of the floating axle than to the respective jockey wheel of the floating axle. The connection points can also be located in the center of the respective floating axle.

According to an embodiment of the invention, the jockey wheels of the floating axles arranged in the longitudinal direction and/or the jockey wheels of the floating axle arranged in the transverse direction are designed so as to be steerable. The respective jockey wheels can be steerable in that they can passively assume a steering position, i.e. can assume an angle with respect to straight travel, and/or the respective jockey wheels can be actively steerable, i.e. actively moved into a steering position. The steerable jockey wheels can preferably also be driven, i.e. form additional drive wheels.

BRIEF DESCRIPTION OF THE DRAWINGS

The invention will be explained by way of example in the following, with reference to the drawings.

FIG. 1 is a schematic view from below of a driverless transport system that is not in accordance with the invention.

FIGS. 2a and 3a are schematic side views of a driverless transport system that is not in accordance with the invention, in different driving situations.

FIG. 4a is a schematic view from the front of a driverless transport system that is not in accordance with the invention, in a further driving situation.

FIGS. 2b and 3b are schematic side views of a driverless transport system according to the invention, in the driving situations according to FIGS. 2a and 2b.

FIG. 4b is a schematic view from the front of a driverless transport system according to the invention, in the further driving situation according to FIG. 4a.

DETAILED DESCRIPTION OF THE INVENTION

Figure 5:
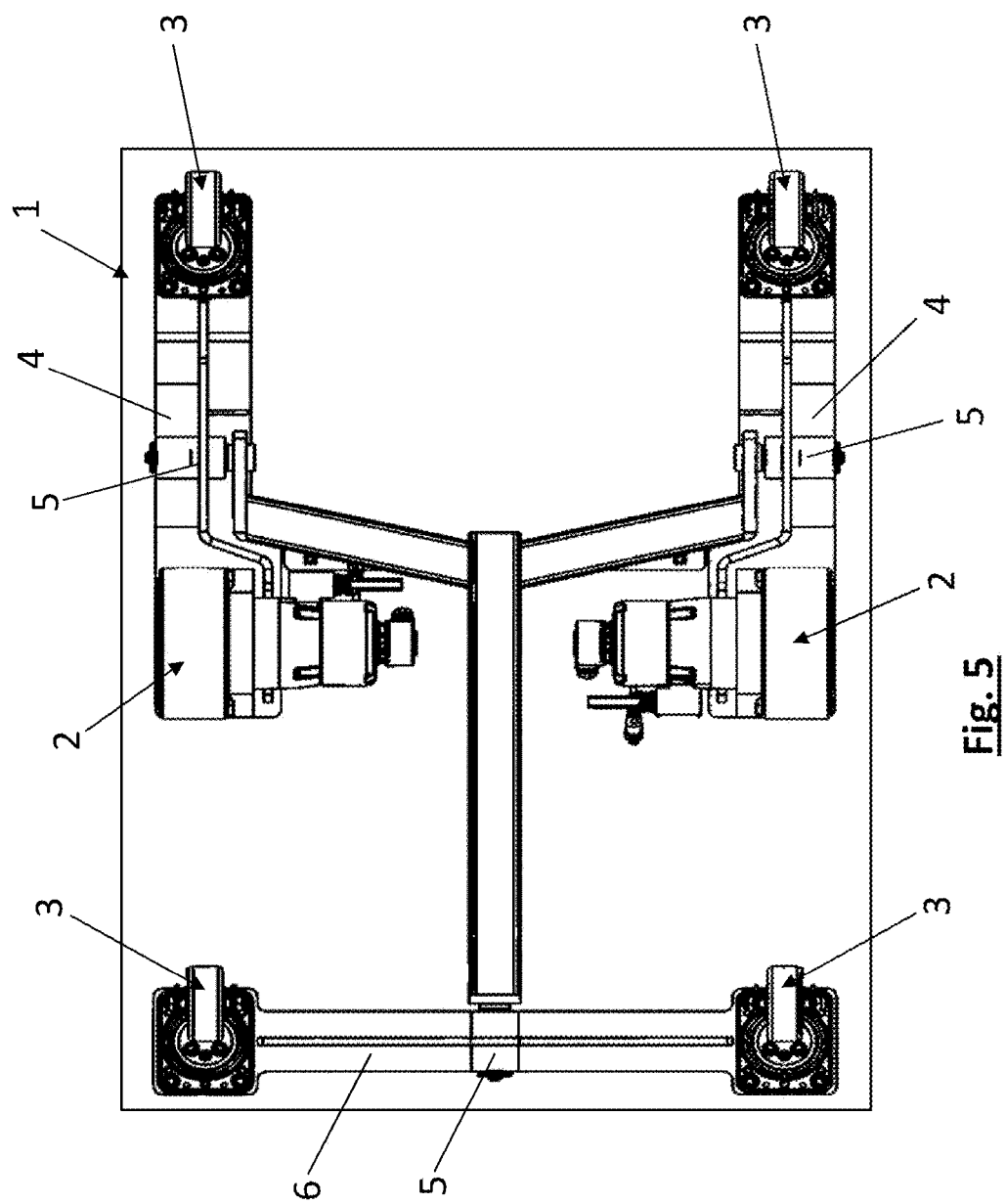
FIG. 5 is a schematic view from below of a driverless transport system according to the invention.

FIG. 1 is a view from below of a driverless transport system that is not in accordance with the invention.

The transport system of FIG. 1 comprises a chassis 1, on which two centrally located drive wheels 2 are arranged laterally, and centrally in the longitudinal direction of the transport system. In addition, the transport system comprises four jockey wheels 3 or support rollers which are arranged in the corners of the transport system. The drive wheels 2 and the jockey wheels 3 are fixedly connected to the chassis 1.

The transport system of FIG. 1 that is not in accordance with the invention is shown from the side in FIGS. 2a and 3a and from the front in FIG. 4a, in different problematic driving situations.

By way of comparison, a vehicle according to the invention is shown in FIGS. 2b, 3b and 4b, in the same driving situations, viewed from the side in each case.

The advantageous effect of an undercarriage or transport system according to the invention is achieved by the combination of the three floating axles 4, 6. The front floating axle 6, arranged in the transverse direction, and the rear floating axles 4, arranged in the longitudinal direction, are first considered separately in FIGS. 2b, 3b and 4b, and then the interaction is explained.

FIGS. 2 and 3, which compare the prior art with the newly developed undercarriage geometry, show the optimized driving behavior which is achieved by the rear floating axles 4.

The rear axle is thus capable of compensating ground changes (see FIGS. 2a and 2b) and of performing vertical movements. As a result, permanent ground contact of all the wheels 2, 3 and damping of impacts is achieved. The undercarriage geometry also makes it possible to handle larger inclines (see FIGS. 3a and 3b) without prematurely resting on the jockey wheels 3 or without loss of ground contact of the drive wheels 2.

FIG. 4 also compares the prior art (FIG. 4a) with the new undercarriage geometry (FIG. 4b) of the front axle. Ground unevenness such as holes can be compensated by the undercarriage that is mounted centrally at the front (FIG. 4b). The floating axle 6 makes it possible for the jockey wheels 3 to perform a vertical movement and thus dip into the hole in the roadway. In this case, the opposite jockey wheel 3 remains on the ground. In comparison therewith, in the case of a rigid front axle or in the case of fixedly mounted jockey wheels 3, the drive wheel 2 would not dip into the hole, but rather lose ground contact (FIG. 4a). This would result in unstable driving behavior. Slight unevenness or objects located on the roadway would also be transferred undamped to the chassis of the vehicle. To clarify, it should also be mentioned here that the floating axle 6 which connects the two jockey wheels 3 is preferably designed as a rigid element.

Only as a result of the combination of the arrangement of the three floating axles 4 and 6 in a driverless transport system is it possible, in the case of inclines or uneven roadways, to ensure permanent road adherence with all wheels 2, 3. In addition, damping is achieved without the use of shock absorbers.

Therefore, a driverless transport system according to the invention, as shown for example from above in FIG. 5, comprises a chassis 1, drive wheels 2 and jockey wheels 3, wherein, on each of a first side of the chassis 1 and a second side of the chassis 1 opposite the first side, a floating axle 4 arranged in the longitudinal direction is pivotably connected to the chassis 1 at a connection point 5 assigned in each case, a drive wheel 2 being arranged at one end of each of the floating axles 4 and a jockey wheel 3 being arranged at the opposite end of each of the floating axles 4, the driverless transport system additionally having a floating axle 6 arranged in the transverse direction which is aligned transversely to the two floating axles 4 arranged in the longitudinal direction and is also pivotably connected to the chassis 1 at an assigned connection point 5, a jockey wheel 3 being arranged at each end of the floating axle 6 arranged in the transverse direction.

The two floating axles 4 arranged in the longitudinal direction are oriented so as to be in parallel with one another, and the floating axle 6 arranged in the transverse direction is oriented so as to be normal to the two floating axles 4 arranged in the longitudinal direction.

The drive wheels 2 of the floating axles 4 arranged in the longitudinal direction are each arranged at the end of the floating axles 4 which is closer to the floating axle 6 arranged in the transverse direction, i.e. "at the front" in the transport system, and thus closer to the center of the vehicle in the vehicle longitudinal direction.

The floating axle 6 arranged in the transverse direction is located in the front of the transport system and thus forms a front axle of the transport system. The floating axles 4 arranged in the longitudinal direction form the rear axle of the transport system.

The chassis 1 is rectangular in shape.

The four jockey wheels 3 of the three floating axles 4, 6 together form a rectangle.

The four jockey wheels 3 are located in the corners of the chassis 1.

The respective connection points 5 at which the floating axles 4 arranged in the longitudinal direction are pivotably connected to the chassis 1 are located closer to the respective drive wheel 2 of the floating axle 4 than to the respective jockey wheel 3 of the floating axle 4.

Structural integration of three floating axles 4, 6, in a driverless transport system makes it possible, as described, to achieve better properties with respect to the driving behavior of the transport system. Three axles 4, 6 are used, and the wheels 2, 3, i.e. all the wheels of the transport system, are connected to the chassis 1 at three points, specifically the connection points 5. This ensures that usually all (six) wheels always rest on the ground/substrate. Raising a wheel would be possible only in extreme situations, or would be possible only if the roadway holes are so deep that the structurally or mechanically possible vertical/ compensating lift of the floating axles is exceeded. In practice, this could occur for example if one wheel dipping into a deep unevenness in the roadway were to cause such significant upward deflection of the wheel arranged on the opposite side of the floating axle that said opposite wheel already strikes the chassis which is usually arranged thereabove.

The floating axles 4, 6 make it possible for both the drive wheels 2 and the jockey wheels 3 to perform a perpendicular movement in both directions, and as a result to compensate unevenness on the roadway under normal conditions. This driving behavior is possible only due to the combination of the three floating axles.

LIST OF REFERENCE NUMBERS 1 chassis
2 drive wheel
3 jockey wheel
4 floating axle arranged in the longitudinal direction
5 connection point
6 floating axle arranged in the transverse direction

The invention claimed is:

1. A driverless transport system comprising a chassis, drive wheels and jockey wheels, wherein a first floating axle on a first side of the chassis and a second floating axle on a second side of the chassis opposite the first side, each of the first and second floating axles arranged in the longitudinal direction, are pivotably connected to the chassis at a first and second connection point assigned in each case, a drive wheel being arranged at one end of each of the floating axles and a jockey wheel being arranged at the opposite end of each of the floating axles, the driverless transport system additionally having a third floating axle arranged in the transverse direction which is aligned transversely to the two floating axles arranged in the longitudinal direction and is pivotably or fixedly connected to the chassis at an assigned connection point, a jockey wheel being arranged at each end of the third floating axle arranged in the transverse direction, wherein all wheels of the transport system are connected to the chassis at three points, and the first, second and third floating axles are structurally integrated via a structural integration component.

2. Driverless transport system according to claim 1, characterized in that, at least in normal operation upon movement of the transport system in a forwards direction, the first and second floating axles arranged in the longitudinal direction are oriented so as to be in parallel with one another, and/or the third floating axle arranged in the transverse direction is oriented so as to be normal to the first and second floating axles arranged in the longitudinal direction.

3. Driverless transport system according to claim 1, characterized in that the drive wheels of the first and second floating axles arranged in the longitudinal direction are each arranged at the end of the floating axles which is closer to the third floating axle arranged in the transverse direction.

4. Driverless transport system according to claim 1, characterized in that the third floating axle arranged in the transverse direction is located in the front of the transport system and thus forms a front axle of the transport system.

5. Driverless transport system according to claim 1, characterized in that the four jockey wheels of the three floating axles form a rectangle.

6. Driverless transport system according to claim 1, characterized in that the chassis is rectangular in shape.

7. Driverless transport system according to claim 6, characterized in that the four jockey wheels are located in the corners of the chassis.

8. Driverless transport system according to claim 1, characterized in that the respective connection points at which the first and second floating axles arranged in the longitudinal direction are pivotably connected to the chassis are located closer to the respective drive wheel of the floating axle than to the respective jockey wheel of the floating axle.

9. Driverless transport system according to claim 1, characterized in that the jockey wheels of the first and second floating axles arranged in the longitudinal direction and/or the jockey wheels of the third floating axle arranged in the transverse direction are designed so as to be steerable.

10. Driverless transport system according to claim 1, characterized in that the floating axle arranged in the transverse direction comprises a first side and a second side, wherein each side is pivotably connected to the chassis at the assigned connection point.

* * * * *